United States Patent
Chen (10) Patent No.: US 10,065,327 B1
(45) Date of Patent: Sep. 4, 2018

(54) ROBOTIC ARM CAPABLE OF CHANGING CLAMPING HEADS RAPIDLY

(71) Applicant: Chih Hsiang Chen, Taichung (TW)

(72) Inventor: Chih Hsiang Chen, Taichung (TW)

(*) Notice: Subject to any disclaimer, the term of this patent is extended or adjusted under 35 U.S.C. 154(b) by 0 days.

(21) Appl. No.: 15/727,149

(22) Filed: Oct. 6, 2017

(51) Int. Cl.
  *B25J 15/00* (2006.01)
  *B25J 15/04* (2006.01)
  *B25J 9/00* (2006.01)

(52) U.S. Cl.
  CPC ......... *B25J 15/0408* (2013.01); *B25J 9/0009* (2013.01); *B25J 15/0019* (2013.01)

(58) Field of Classification Search
  CPC . B25J 15/0408; B25J 15/0009; B25J 15/0019
  USPC .......................................... 294/192, 194, 90
  See application file for complete search history.

(56) References Cited

U.S. PATENT DOCUMENTS

| | | | | |
|---|---|---|---|---|
| 3,850,313 A | * | 11/1974 | Rackman | B65G 57/22 414/591 |
| 4,667,998 A | * | 5/1987 | Borcea | B23Q 7/043 294/116 |
| 5,280,981 A | * | 1/1994 | Schulz | B25J 15/103 294/106 |
| 6,039,375 A | * | 3/2000 | Bauman | B25J 15/0253 294/119.1 |
| D432,403 S | * | 10/2000 | Svensson | D8/394 |
| 7,748,761 B2 | * | 7/2010 | Simons | B25J 15/0253 294/119.1 |
| 8,186,733 B2 | * | 5/2012 | Geary | B25J 15/0246 294/119.1 |
| 8,573,662 B2 | * | 11/2013 | Thiel | B66C 1/04 294/192 |
| 8,740,273 B2 | * | 6/2014 | He | B25J 15/00 294/192 |
| 2013/0334831 A1 | * | 12/2013 | Maffeis | B25J 15/0028 294/207 |
| 2014/0044237 A1 | * | 2/2014 | Ferrer | B25J 15/0028 378/73 |
| 2014/0132018 A1 | * | 5/2014 | Claffee | B25J 9/0015 294/192 |
| 2018/0009111 A1 | * | 1/2018 | Ho | B25J 9/1687 |

* cited by examiner

*Primary Examiner* — Paul T Chin
(74) *Attorney, Agent, or Firm* — Birch, Stewart, Kolasch & Birch, LLP (57) ABSTRACT

A robotic arm has an arm assembly, a connection device, and a clamping device. The arm assembly has a bottom base and a connecting base. The connection device is connected with the connecting base and has a housing and a locking member. The housing is connected securely with the connecting base and has a mounting hole defined in a side of the housing. The locking member is mounted moveably in the housing and extends into the mounting hole. The clamping device is combined with the connection device and has a head rod and a clamping head. The head rod has a first end and a second end. The first end extends into the mounting hole and is securely connected with the locking member. The second end is opposite the first end and is provided with a holding recess. The clamping head is mounted securely on the second end of the head rod.

6 Claims, 11 Drawing Sheets

ROBOTIC ARM CAPABLE OF CHANGING CLAMPING HEADS RAPIDLY

BACKGROUND OF THE INVENTION

1. Field of the Invention

The present invention relates to a robotic arm, and more particularly to a robotic arm that is capable of changing clamping devices rapidly.

2. Description of Related Art

Robotic arms are widely used in the industry to save manpower and to reduce the cost of manufacturing. The robotic arms have advantage of low error rate and high efficiency, so the robotic arms have been mainstream equipments in the industry.

The conventional robotic arm is combined with a clamping device manually to allow the robotic arm to clamp specific objects. However, in an assembly line, usually various objects are involved, so a single kind of clamping device cannot be applied to all of the objects in different sizes, weights or shapes. Therefore, different kinds of clamping devices have to be mounted on the robotic arm to fit with different work demands. However, manually changing the clamping device on the conventional robotic arm is laborious and time-consuming, and the working efficiency is lowered. Multiple robotic arms connected respectively with different kinds of clamping devices can solve the aforementioned problems, but this will cause the increase of cost. In addition, the multiple robotic arms may interference with each other during the operation.

To overcome the shortcomings, the present invention tends to provide a robotic arm to mitigate or obviate the aforementioned problems.

SUMMARY OF THE INVENTION

The main objective of the invention is to provide a robotic arm that can change different clamping devices rapidly.

The robotic arm has an arm assembly, a connection device, and a clamping device. The arm assembly has a bottom base and a connecting base. The connection device is connected with the connecting base and has a housing and a locking member. The housing is connected securely with the connecting base and has a mounting hole defined in a side of the housing. The locking member is mounted moveably in the housing and extends into the mounting hole. The clamping device is combined with the connection device and has a head rod and a clamping head. The head rod has a first end and a second end. The first end extends into the mounting hole and is securely connected with the locking member. The second end is opposite the first end and is provided with a holding recess. The clamping head is mounted securely on the second end of the head rod.

Other objects, advantages and novel features of the invention will become more apparent from the following detailed description when taken in conjunction with the accompanying drawings.

DETAILED DESCRIPTION OF PREFERRED EMBODIMENT

Figure 1:
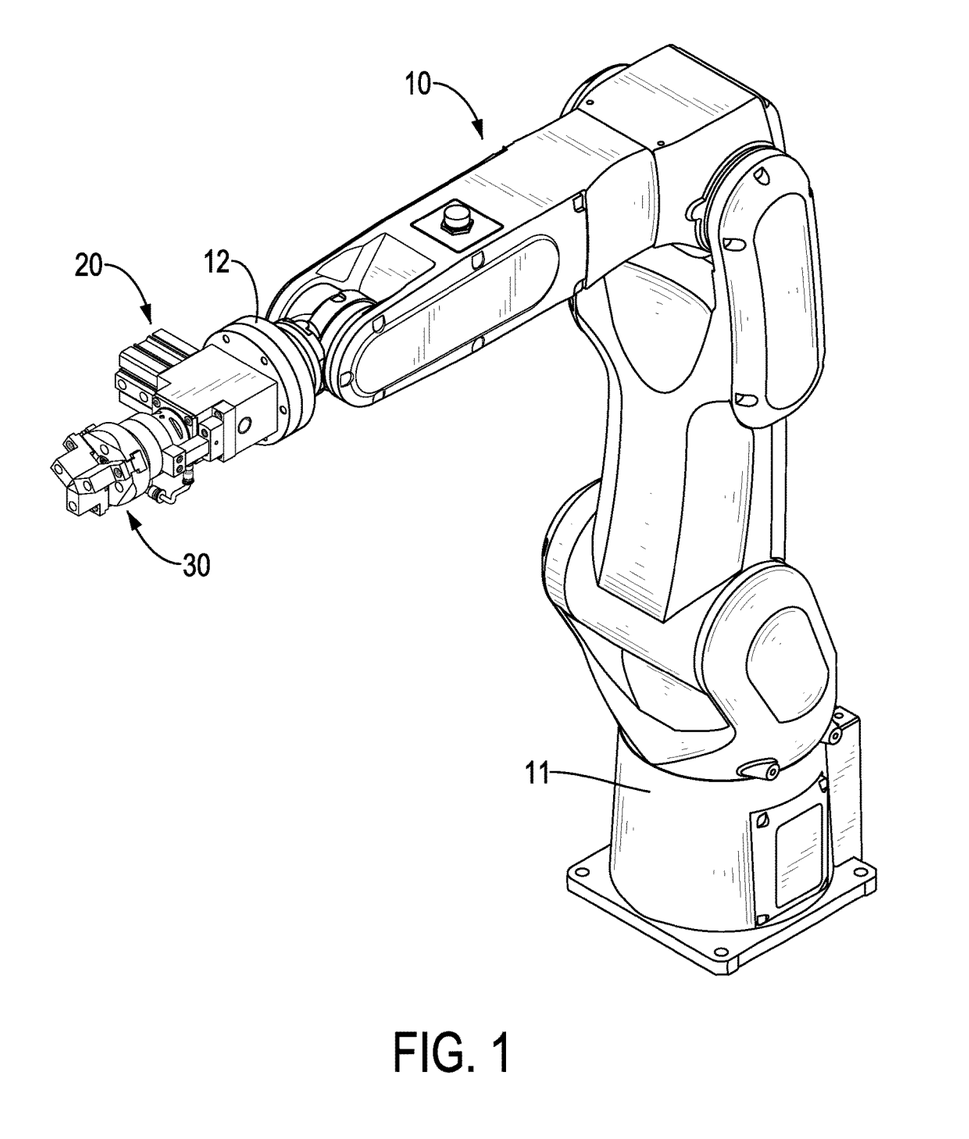
FIG. 1 is a perspective view of a robotic arm in accordance with the present invention.
Figure 2:
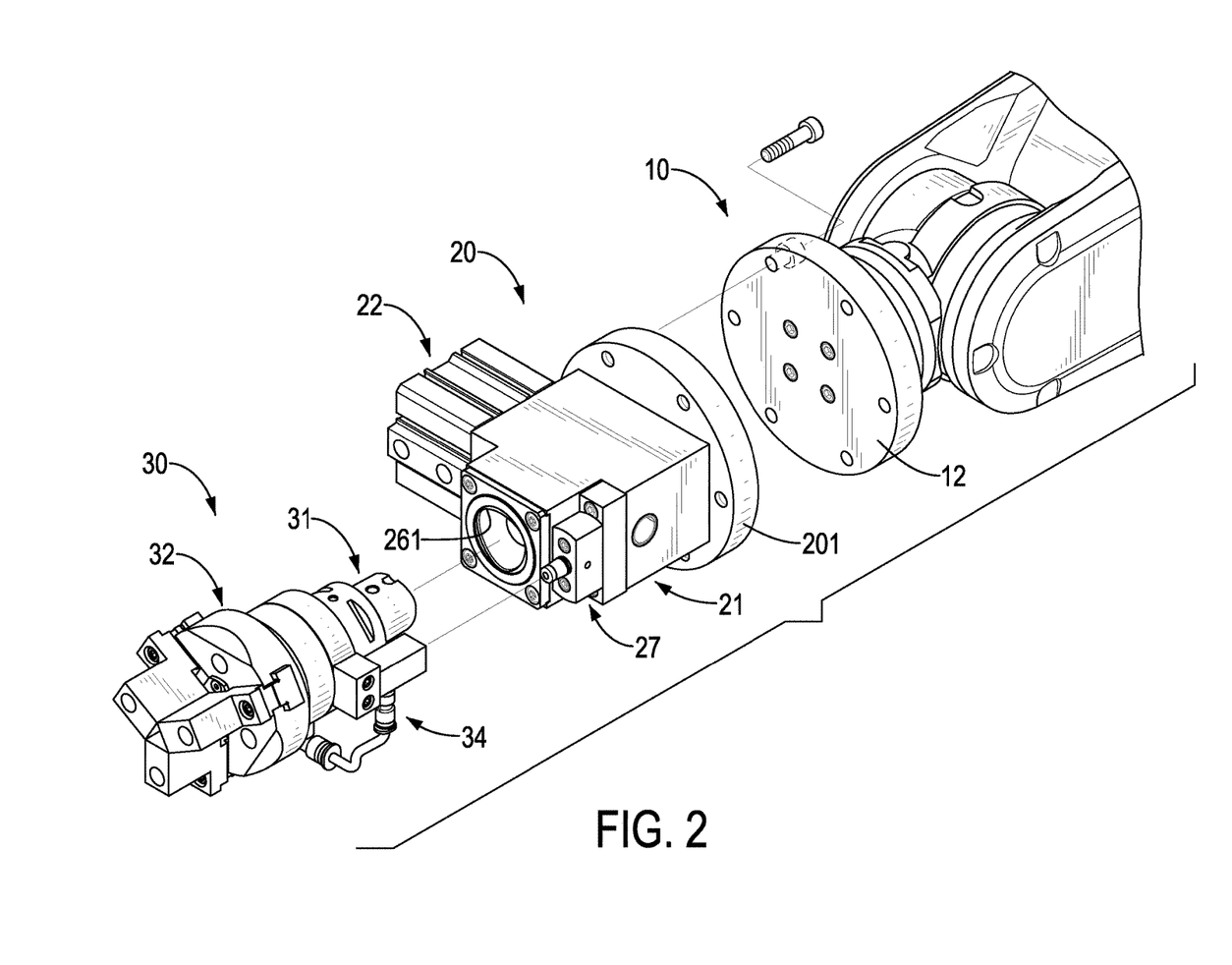
FIG. 2 is an enlarged exploded perspective view of the robotic arm in FIG. 1.

With reference to FIGS. 1 and 2, a robotic arm in accordance with the present invention comprises an arm assembly 10, a connection device 20, and a clamping device 30.

Figure 9:
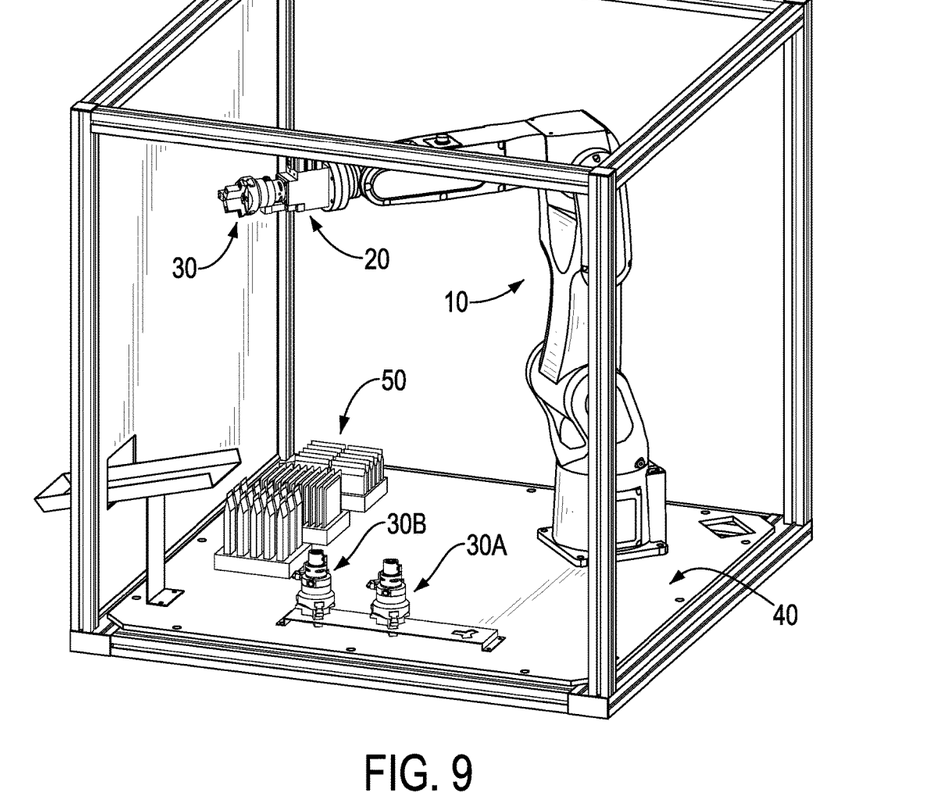
FIG. 9 is an operational perspective view of the robotic arm in FIG. 1.

The arm assembly 10 is composed of multiple arms pivotally connected with each other and comprises a bottom base 11 and a connecting base 12. The bottom base 11 is attached to a work platform 40 as shown in FIG. 9, such that the arm assembly 10 can be swung or pivoted relative to and on the platform 40. The connecting base 12 is mounted on an end of the arm assembly 10 opposite the bottom base 11 and is located above the platform 40.

Figure 3:
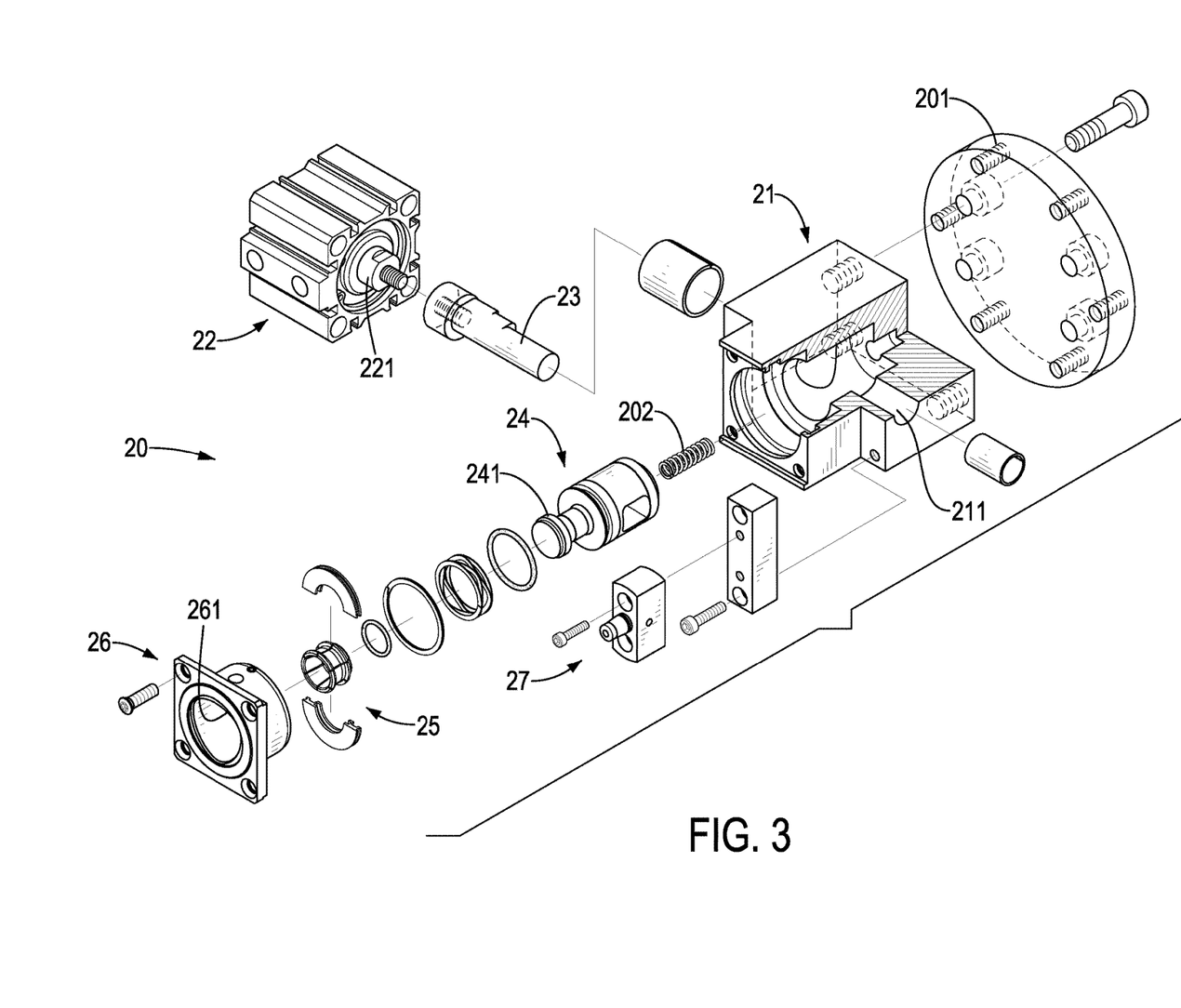
FIG. 3 is an enlarged exploded perspective view in partial section of the robotic arm in FIG. 1.

With reference to FIGS. 2 and 3, the connection device 20 is connected with the connecting base 12 by a connecting disk 201 and comprises a housing 21, a cylinder 22, a cam 23, a driven member 24, a locking member 25, a casing 26, and a pneumatic connector 27. The housing 21 is connected with the connecting disk 201 and has a channel 211 defined through two sides of the housing 21. The cylinder 22 is mounted on one of the two sides of the housing 21 through which the channel 211 is defined and has a cylinder rod 221. The cam 23 is mounted moveably in the channel 211 and is connected with the cylinder rod 221. The driven member 24 is moveably mounted axially in the housing 21, is perpendicularly connected with the cam 23, and is connected with a resilient member 202. The driven member 24 has a head 241 formed on an end of the driven member 24 distal from the cam 23. The locking member 25 is mounted around the driven member 24 and is located between the head 241 and a conjunction between the driven member 24 and the cam 23. When the end of the locking member 25 adjacent to the head 241 is compressed, the end will be expanded radially. The casing 26 is mounted on and extends into the housing 21 and is connected with the locking member 25. A mounting hole 261 is defined axially through the casing 26 and is co-axial with the driven member 24. The head 241 of the driven member 24 extends into the mounting hole 261. The pneumatic connector 27 is mounted on the housing 21 at a position adjacent to the mounting hole 261 and is connected with a pressured air source, such that pressured air can be led into the elements connected with the pneumatic connector 27.

Figure 4:
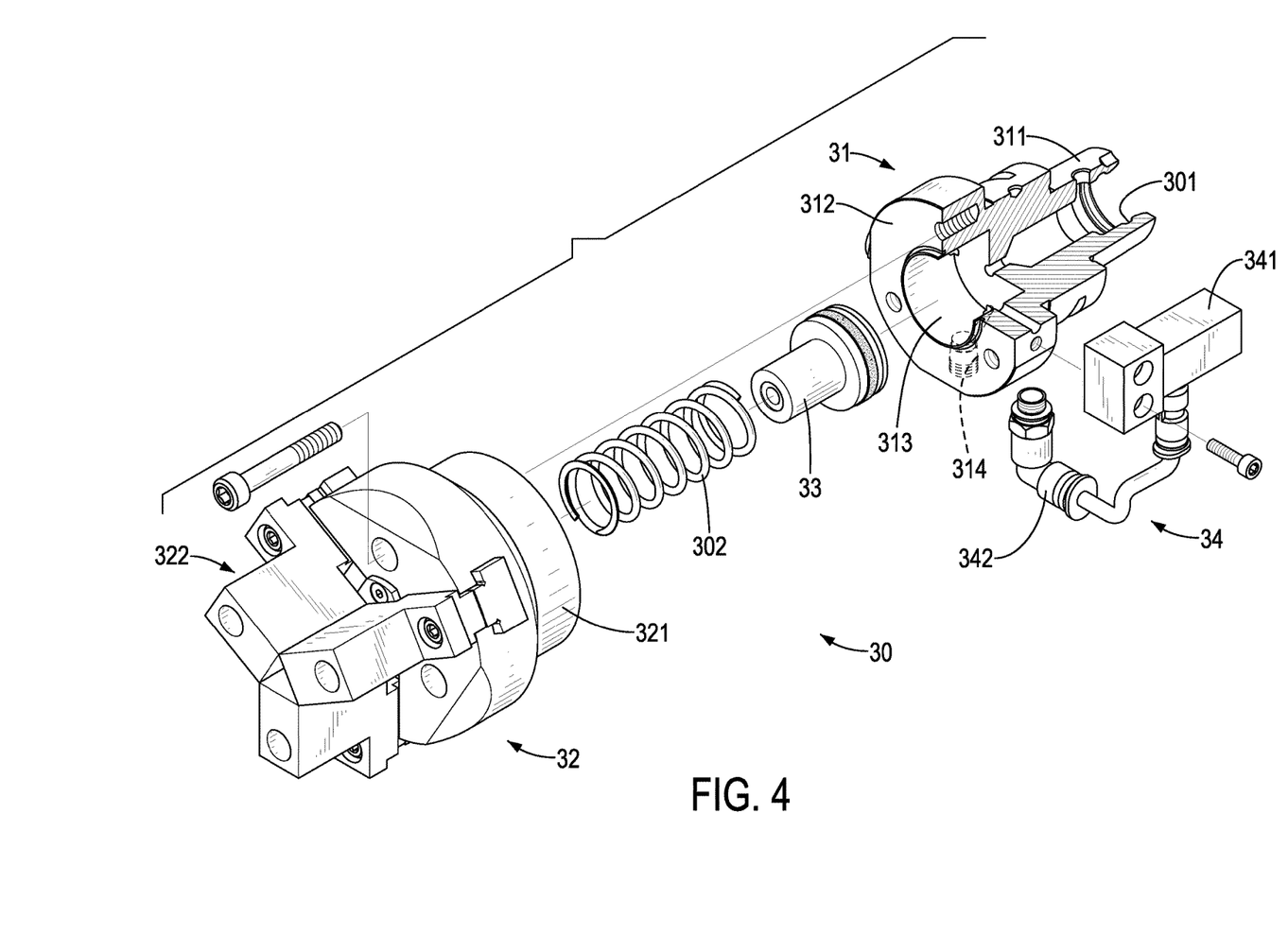
FIG. 4 is another enlarged exploded perspective view in partial section of the robotic arm in FIG. 1.

With reference to FIGS. 2 and 4, the clamping device 30 is combined with the connection device 20 and comprises a head rod 31, a clamping head 32, a piston 33, and a driving unit 34. The head rod 31 has an axis, extends into the connection device 20, and is connected with the casing 26. The head rod 31 has two ends respectively formed as a clamping segment 311 and a connecting segment 312. The clamping segment 311 is formed as a sleeve and has a diameter smaller than an inner diameter of the mounting hole 261 in the casing 26, such that the clamping segment 311 is allowed to extend into the mounting hole 261. The clamping segment 311 has an inner diameter larger than a diameter of the head 241 of the driven member 24, such that the clamping segment 311 is mounted around the driven member 24. An annular engaging groove 301 is defined in an inner surface of the clamping segment 311. The connecting segment 312 has a holding recess 313 defined axially in the connecting segment 312, an inlet 314, and an outlet. The inlet 314 and the outlet are defined in an outer surface of the connecting segment 312 and communicate with the holding recess 313, such that pressured air can be led to enter the holding recess 313 via the inlet 314.

The clamping head 32 is mounted securely on the head rod 31 and has two ends respectively provided with a head body 321 and a claw assembly 322. The head body 321 is connected with the end of the head rod 31 that is distal from the clamping segment 311 by fasteners, such as bolts, such that the clamping head 32 is mounted securely on the head rod 31. The claw assembly 322 comprises three claws mounted moveably on the head body 321 and arranged in a circle at equiangular intervals.

The piston 33 is moveably connected with the head rod 31 and the clamping head 32, is mounted moveably in the mounting hole 261, and is connected with the head rod 31 and the claw assembly 322. In addition, a resilient member 302 is disposed between the piston 33 and the clamping head 32 as shown in FIG. 2. The driving unit 34 is attached to the head rod 31 and is connected with the pneumatic connector 27. The driving unit 34 comprises a tube block 341 and a connecting tube 342. The tube block 341 is attached securely to an outer surface of the connecting segment 312 and has a flow passage defined in the tube block 341. When the clamping device 30 is connected with the connection device 20, the flow passage communicates with the pneumatic connector 27. Two ends of the connecting tube 342 are connected respectively with the flow passage in the tube block 341 and the inlet 314 in the connecting segment 312. With such an arrangement, the pressured air can be led into the holding recess 313 to drive the piston 33 to move and to expand the claw assembly 322.

Figure 5:
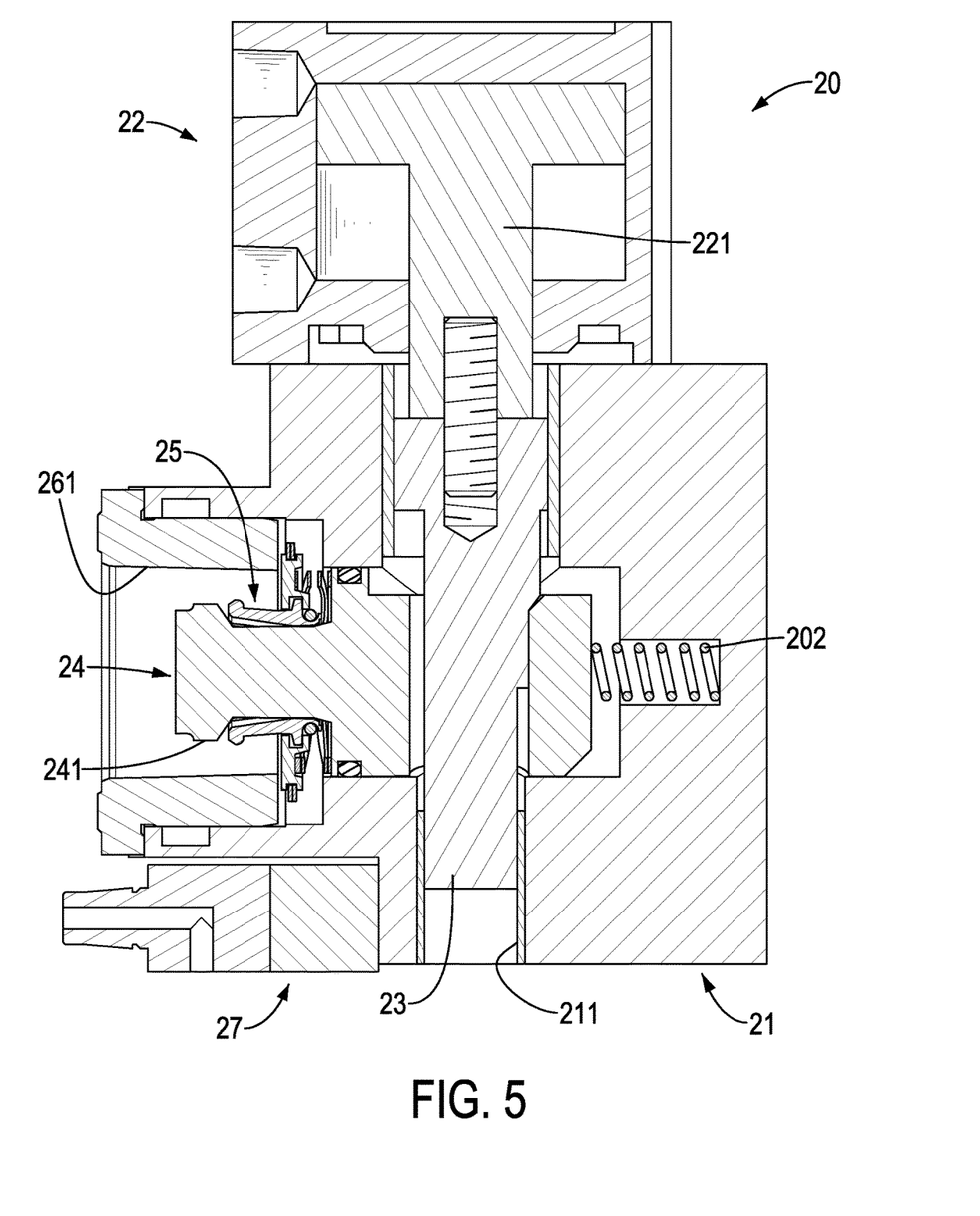
FIG. 5 is an enlarged cross sectional side view of the robotic arm in FIG. 1.
Figure 6:
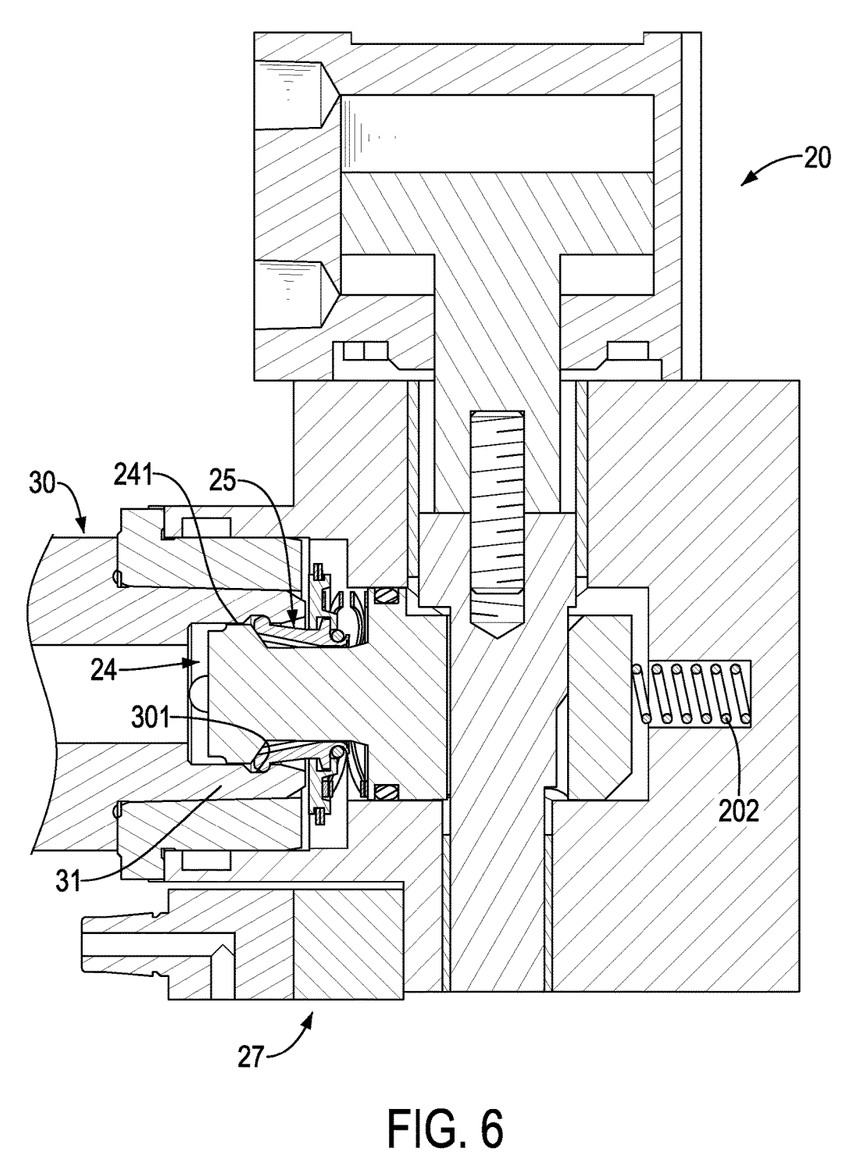
FIG. 6 is an enlarged operational cross sectional side view of the robotic arm in FIG. 1.

To connect the clamping device 30 with the connection device 20, with reference to FIGS. 5 and 6, the head rod 31 is inserted into the mounting hole 261 and the clamping segment 311 is mounted around the head 241 of the driven member 24. At this time, the driving unit 34 is connected with the pneumatic connector 27. The cam 23 is moved by the cylinder rod 221 of the cylinder 22, and the driven member 24 is moved toward the connecting disk 201 and compresses the resilient member 202. Consequently, the head 241 compresses the locking member 25, and the locking member 25 is radially expanded to engage the engaging groove 301 in the clamping segment 311. Accordingly, the clamping device 30 is connected securely with the connection device 20.

Figure 7:
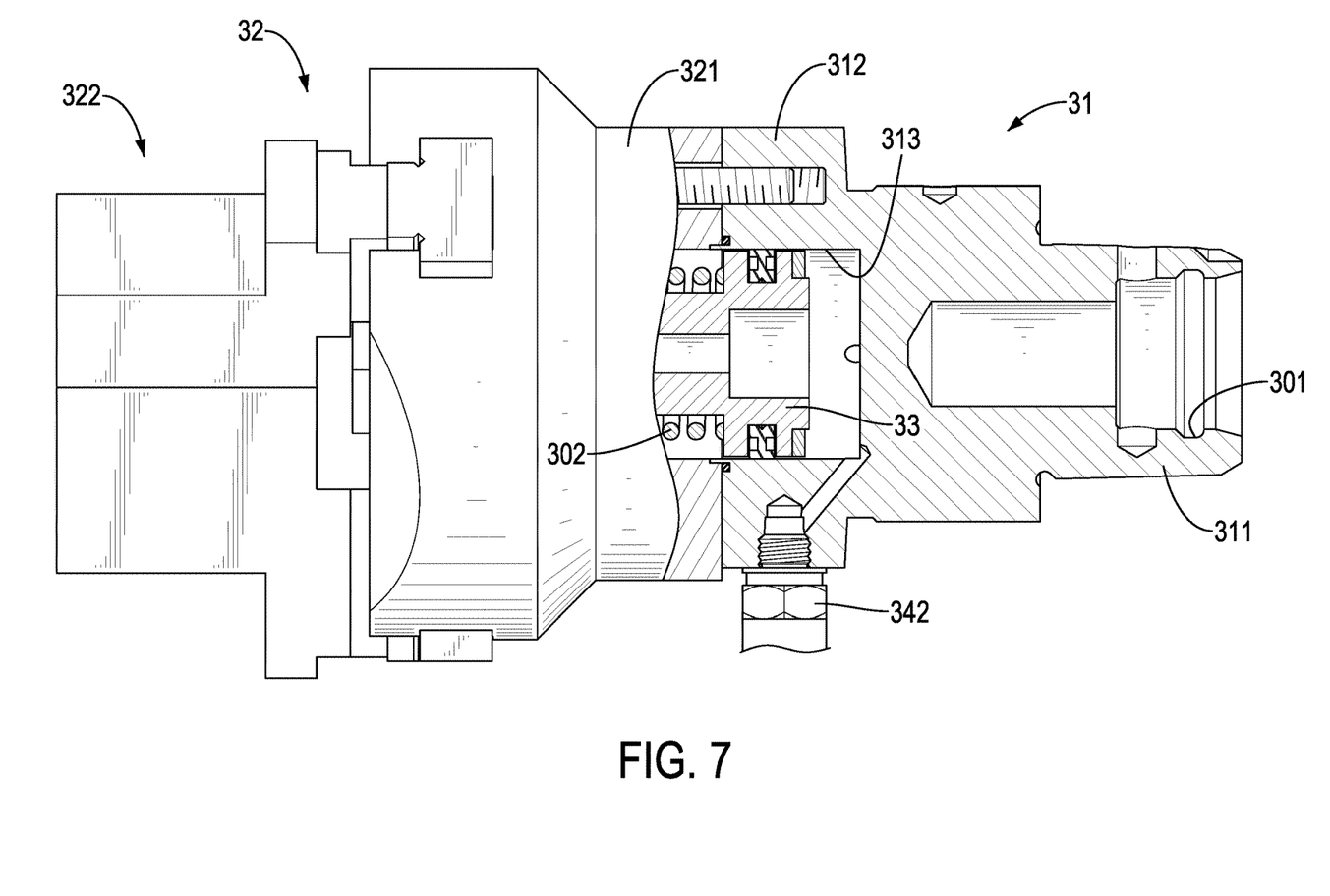
FIG. 7 is an enlarged top view in partial section of the robotic arm in FIG. 1.
Figure 8:
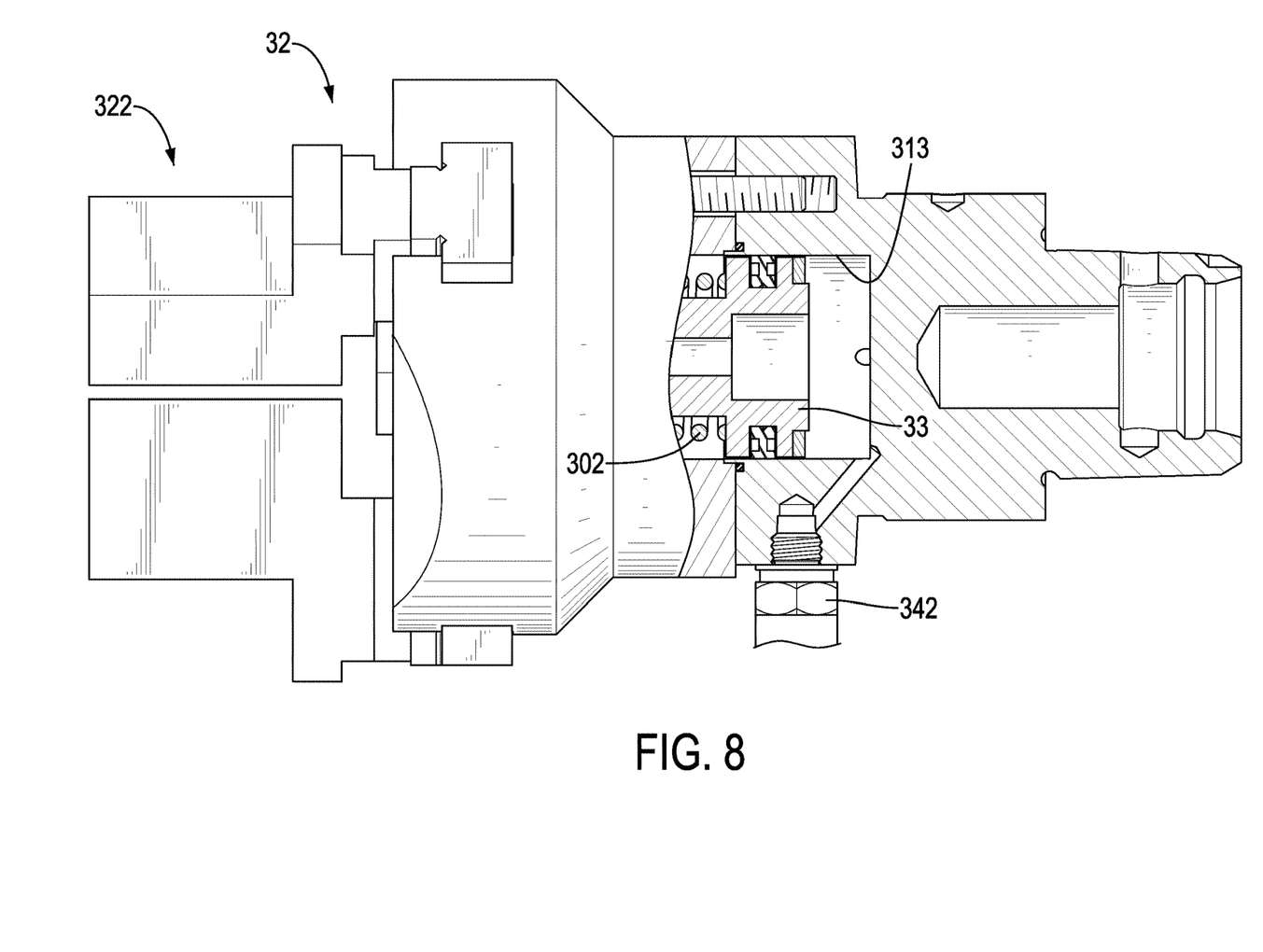
FIG. 8 is an enlarged operational top view in partial section of the robotic arm in FIG. 1.

With reference to FIGS. 7 and 8, after the clamping device 30 is connected securely with the connection device 20, the air source is actuated to supply pressured air to the pneumatic connector 27. The pressured air is led into the holding recess 313 via the flow passage in the tube block 341 and the connecting tube 342 and pushes the piston 33 to move. With the movement of the piston 33, the claws of the claw assembly 322 will be moved radially away from each other and the resilient member 302 is compressed. When supply of the pressured air to the pneumatic connector 27 is stopped, the recoil force provided by the resilient member 302 will push the piston 33 to move backward and the claws are moved toward each other to clamp and hold an object 50.

With reference to FIG. 9, the arm assembly 10 is securely mounted on a work platform 40, and multiple clamping devices 30,30A,30B for clamping different kinds of objects 50 are prepared. Each clamping device 30,30A,30B comprises a head rod 31 having the same structure and a clamping head 32 having a structure different from that of each other for clamping different kinds of objects 50. Therefore, one of the clamping devices 30 is connected with the connection device 20, and the robotic arm can be applied to clamp and pick up a specific kind of objects 50.

Figure 10:
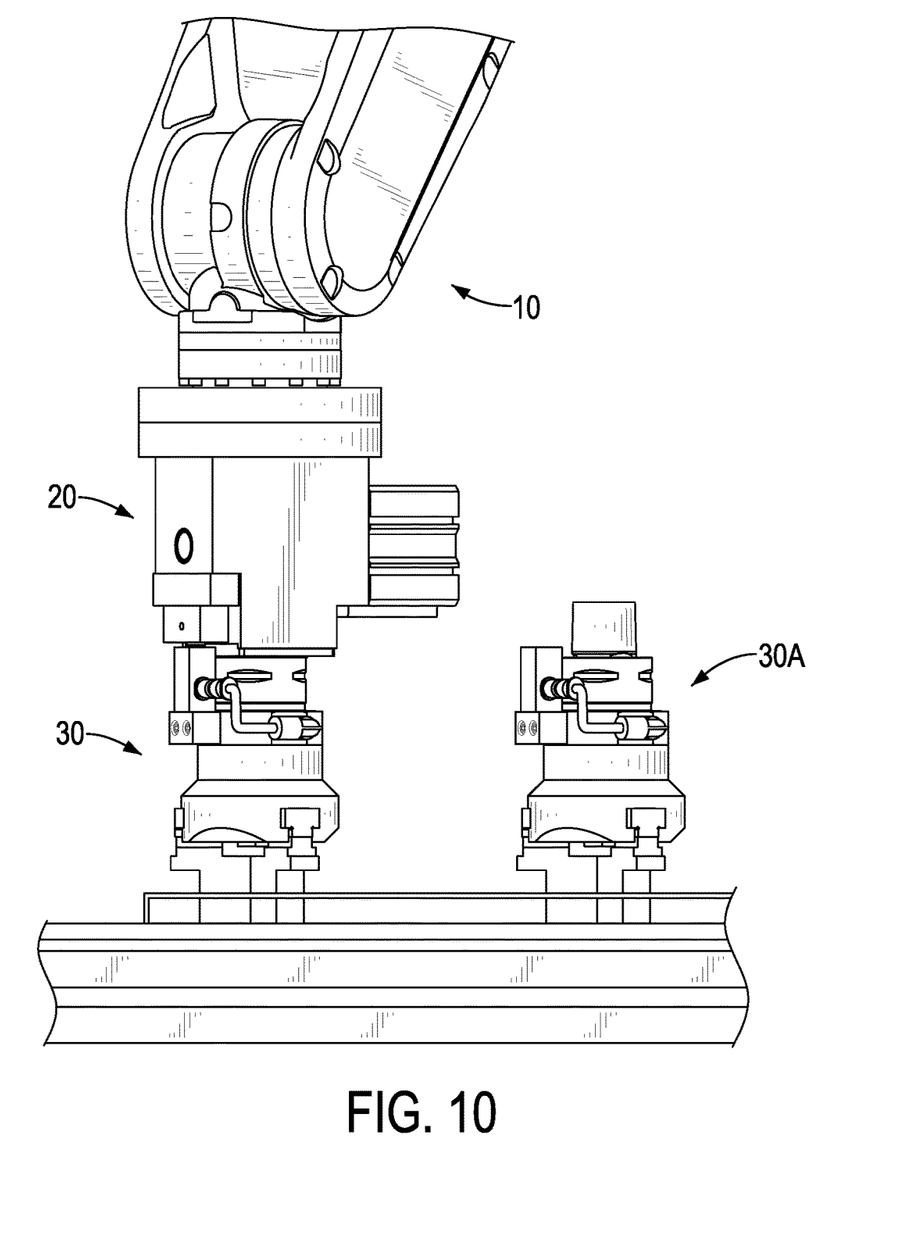
FIG. 10 is an enlarged operational side view of the robotic arm in FIG. 1.
Figure 11:
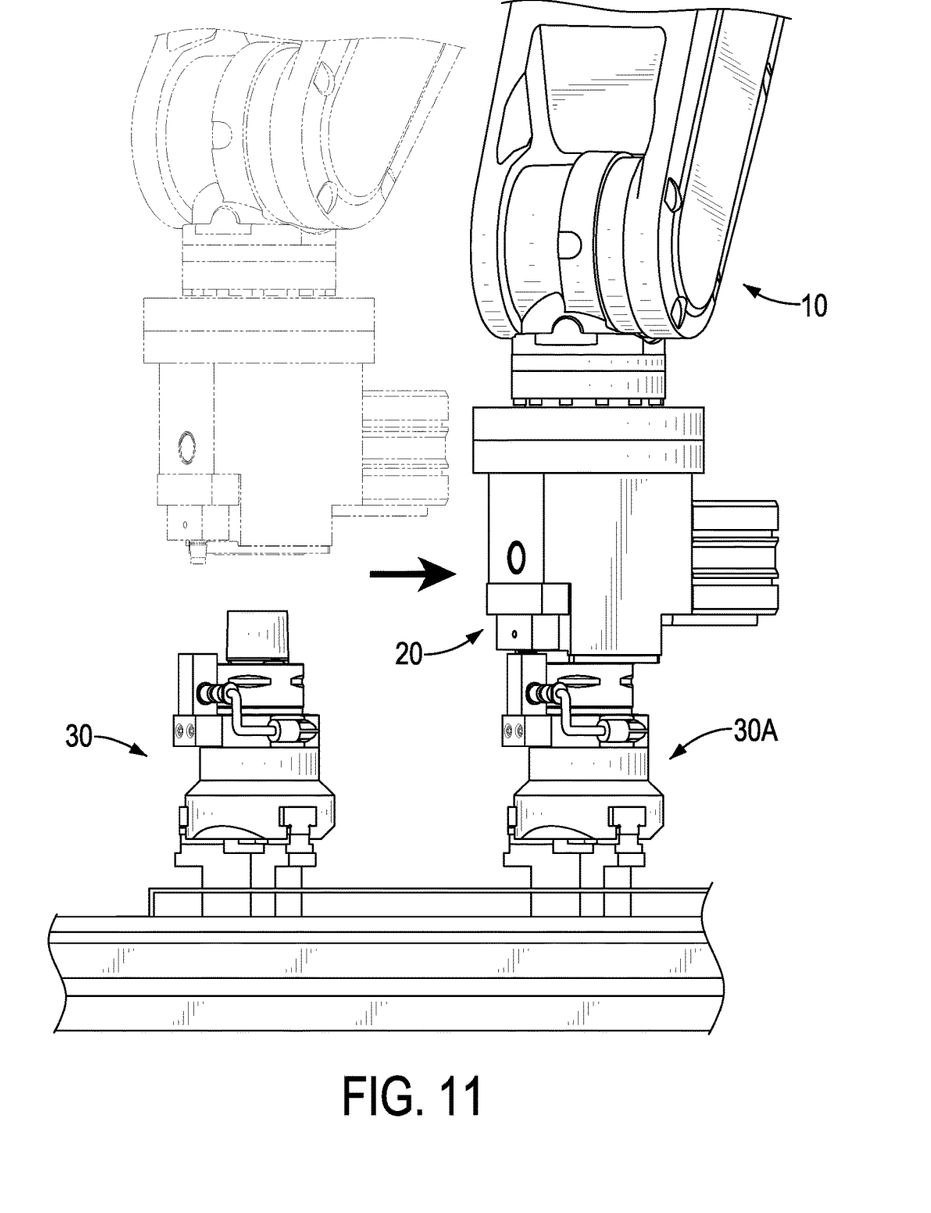
FIG. 11 is an enlarged operational side view of the robotic arm in FIG. 1 showing that the clamping device is replaced with another one.

With reference to FIGS. 10 and 11, to change among different clamping devices 30,30A,30B, the cylinder rod 221 of the cylinder 22 is retracted, and the recoil force provided by the resilient member 202 will push the driven member 24 to move backward. At this time, the head 241 of the driven member 24 will be moved away from the locking member 25, and the locking member 25 is disengaged from the engaging groove 301 in the head rod 31. Consequently, the clamping device 30 can be detached from the connection device 20, and another clamping device 30A,30B can be connected with the connection device 20 to clamp different kinds of objects.

With such an arrangement, because the driving unit 34 can be automatically connected with the pneumatic connector 27 when the clamping device 30, 30A,30B is combined with the connection device 20, the clamping devices 30, 30A,30B can be automatically connected with or detached from the connection device 20. Therefore, the operation of the robotic arm is time-saving and labor-saving. In addition, the amount of the robotic arms in an assembly line can be effectively reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A robotic arm comprising:
   an arm assembly comprising a bottom base and a connecting base;
   a connection device connected with the connecting base and comprising
      a housing connected securely with the connecting base and having a mounting hole defined in a side of the housing; and
      a locking member mounted moveably in the housing and extending into the mounting hole; and
   a clamping device combined with the connection device and comprising
      a head rod having
         a first end extending into the mounting hole and securely connected with the locking member; and
         a second end opposite the first end and provided with a holding recess; and a clamping head mounted securely on the second end of the head rod, wherein the connection device comprises a channel defined through two sides of the housing;

a cylinder mounted on one of the two sides of the housing through which the channel is defined and having a cylinder rod;

a cam mounted moveably in the channel in the housing and connected with the cylinder rod;

a driven member moveably mounted axially in the housing, perpendicularly connected with the cam, and having a head formed on an end of the driven member distal from the cam and extending into the mounting hole in the housing; and a casing mounted on and extending into the housing and connected with the locking member;

the locking member is mounted around the driven member and is located between the head and a conjunction between the driven member and the cam; and the mounting hole is defined through the casing and is co-axial with the driven member.

2. The robotic arm as claimed in claim 1, wherein the clamping head comprises a head body connected with the head rod; and a claw assembly connected with the head rod and comprising three claws mounted moveably on the head body and arranged in a circle at equiangular intervals.

3. The robotic arm as claimed in claim 2, wherein the clamping device further comprises a piston mounted moveably in the mounting hole and connected with the head rod and the claw assembly.

4. The robotic arm as claimed in claim 3, wherein the connection device further comprises a pneumatic connector mounted on the housing at a position adjacent to the mounting hole and adapted to be connected with a pressured air source; and the clamping device further comprises a driving unit attached to the head rod and connected with the pneumatic connector to lead pressured air into the holding recess in the head rod.

5. The robotic arm as claimed in claim 4, wherein the first end of the head rod of the clamping device is formed as a sleeve, is mounted around the head of the driven member, and has an annular engaging groove defined in an inner surface of the first end and selectively engaged with the locking member which is compressed by the driven member and is expanded.

6. The robotic arm as claimed in claim 1, wherein the connection device further comprises a pneumatic connector mounted on the housing at a position adjacent to the mounting hole and adapted to be connected with a pressured air source;

the clamping device further comprises a driving unit attached to the head rod and connected with the pneumatic connector to lead pressured air into the holding recess in the head rod.

* * * * *